July 19, 1966 B. M. GALE 3,261,968
ANGLE ENCODER
Filed Nov. 23, 1962 4 Sheets-Sheet 1

INVENTOR.
BERNARD M. GALE
BY
Roger W. Jensen
ATTORNEY

INVENTOR.
BERNARD M. GALE

United States Patent Office 3,261,968
Patented July 19, 1966

3,261,968
ANGLE ENCODER
Bernard M. Gale, Clearwater, Fla., assignor to
Honeywell Inc., a corporation of Delaware
Filed Nov. 23, 1962, Ser. No. 239,600
8 Claims. (Cl. 235—154)

This invention pertains to improvements in digital angle encoders and more particularly to a digital angle encoder which eliminates errors due to bearing eccentricity.

Prior art encoders comprise a rotor, or drum, which has its peripheral surface covered by a sensitive magnetic layer on which is recorded a first and a second magnetic line. The first and second magnetic lines are substantially colinear in a line parallel to the axis of the drum. Positioned adjacent to the surface of the rotor over the tracks of the first and second magnetic lines, respectively, is a fixed readout head and a movable readout head. By "tracks" are meant the surfaces traced by the magnetic heads when the drum rotates. The fixed and movable readout heads control a gate which has a pulse generator connected to its input and a counter connected to its output. The pulse generator may be either a separate generator or it may utilize separate magnetic lines recorded on the surface of the rotor in a "clock" track.

When the first magnetic line passes under the fixed readout head a pulse is induced in the head and operates to open the gate and cause the counter to count the pulses from the pulse generator. When the second magnetic line passes under the movable readout head a pulse is induced in the movable head and this pulse operates to close the gate and stop the pulse count. The resultant count in the counter is a measure of the angle between fixed and movable readout heads.

Because of eccentricity of support bearings for the encoder rotor and movable pickup head, an error results in the counter pulse count so that the count is not a correct indication of the angle between the fixed and movable pickup heads. The manner in which bearing eccentricity causes a pulse count error will be explained more fully hereinafter. The present invention corrects for the error caused by eccentricity of the bearings.

In the present invention, a third and a fourth magnetic lines are recorded on the magnetic surface of the rotor, the third and fourth magnetic lines being colinear in a line parallel to the axis of the drum and being substantially 180° displaced around the periphery of the rotor from the first and second magnetic lines. A second fixed readout head is mounted adjacent to the rotor surface and over the track containing the third magnetic line. The second fixed head is displaced 180° around the rotor periphery from the first fixed head. A second movable readout head is mounted adjacent to the rotor surface over the track containing the fourth magnetic line and is displaced 180° around the periphery of the rotor from the first movable readout head.

As explained above, the first and second fixed readout heads, the first and second movable readout heads, the first and second recorded magnetic lines, and the third and fourth recorded magnetic lines are each 180° displaced from each other. In a mechanically perfect encoder the indicated angle between the first fixed head and the first movable head would exactly equal the indicated angle between the second fixed head and the second movable head. However, due to eccentricity of the support bearings the indicated angles between the fixed and movable readout heads will be in error. Due to the displacement of the first and second fixed and movable heads, the error in the indicated angle between the first fixed head and the first movable head will be equal and opposite to the error in the indicated angle between the second fixed head and the second movable head.

To correct for the angle error, a pulse generator, having a first output of pulses at a particular frequency and a second output of pulses at one-half the particular frequency, is connected through a logic gate to a pulse counter.

The fixed and movable readout heads are connected to the logic gate whereby a signal induced in the first fixed readout head activates the logic gate and causes the counter to count the pulses at one-half the particular frequency from the pulse generator. A signal induced in the second fixed head causes the counter to count the pulses at the particular frequency from the pulse counter. A pulse induced in the first movable readout head activates a logic gate and again causes the counter to count the pulses at one-half the particular frequency from the pulse generator. A signal induced in the second movable head deactivates the logic gate and stops the pulse count. The resultant count in the counter is a correct indication of the desired angle.

It is an object of this invention to provide an improved digital angle encoder.

Another object of this invention is to provide an improved digital angle encoder when errors due to bearing eccentricity are eliminated.

These and other objects of this invention will become apparent to those skilled in the art upon consideration of the accompanying specification, claims, and drawings of which:

Figure 1:
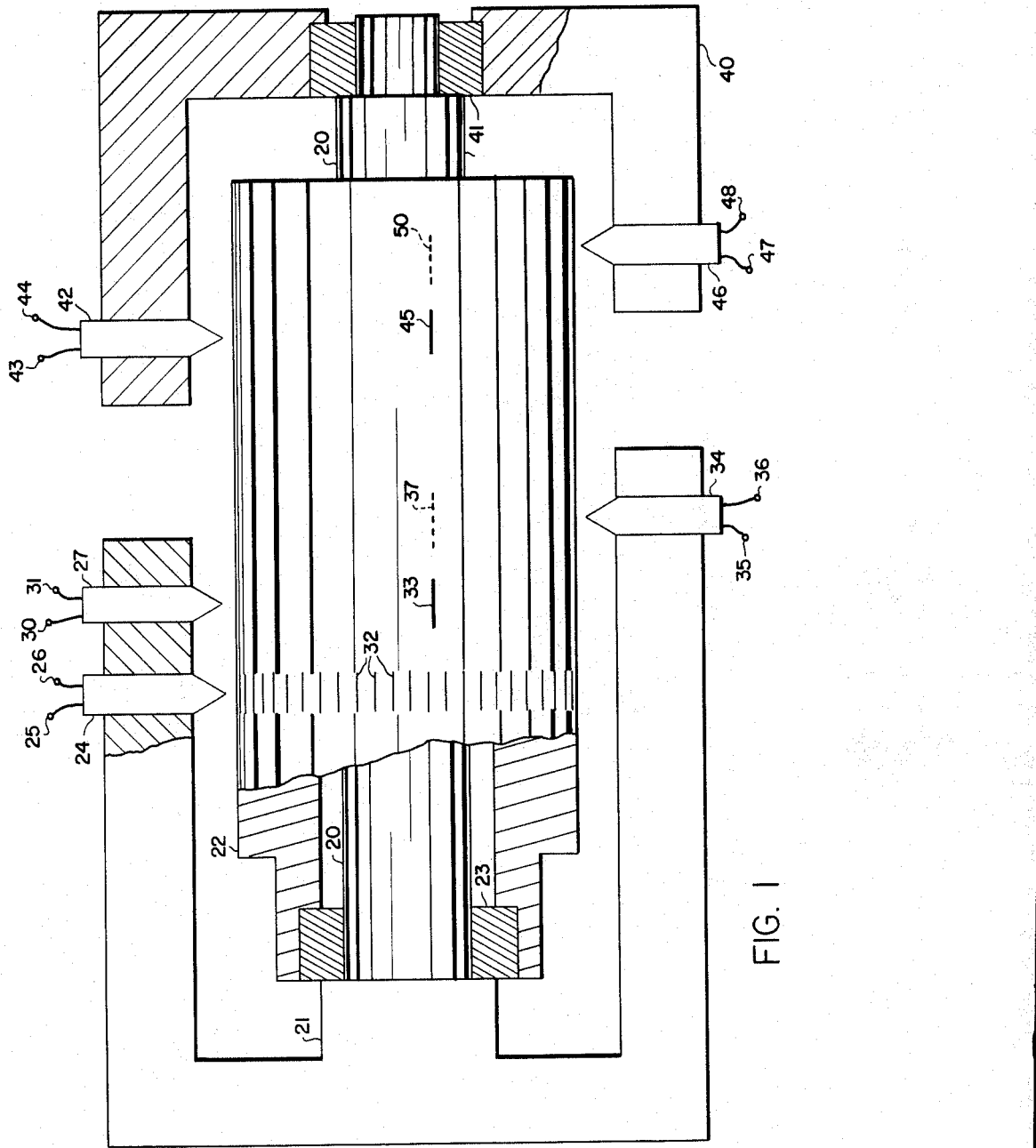
FIGURE 1 shows a diagrammatic sketch of an embodiment of this invention.

Referring to FIGURE 1 there is shown a shaft 20 rigidly connected to a fixed member 21. A hollow cylindrical magnetic drum 22 is coaxially mounted on shaft 20, one end of drum 22 being supported by a bearing 23 and the other end of drum 22 being supported by a similar bearing (not shown). Drum 22 is free to rotate on shaft 20 and can be driven by any suitable driving means such as a motor (not shown).

First and second sensing devices such as a first magnetic readout head 24, having output leads 25 and 26, and a second magnetic readout head 27, having output leads 30 and 31, are mounted on fixed member 21 and are positioned adjacent to the surface of drum 22. A plurality of equally spaced magnetic lines 32 are recorded around the circumference of the surface of drum 22 in a track directly beneath readout head 24. Magnetic lines 32 comprise "clock" pulses and readout head 24 is designated the "clock" readout head.

A single signal producing means such as a magnetic line 33 is recorded on the surface of drum 22 in a track directly beneath magnetic head 27. Magnetic head 27 is designated the first fixed, or stationary, readout head.

A third magnetic readout head 34, having output leads 35 and 36, is mounted on fixed member 21 and is positioned adjacent to the surface of drum 22. Readout head 34 is displaced 180° around the circumference of drum 22 from readout head 27. A single magnetic line 37 is recorded on the surface of drum 22 in a track directly beneath magnetic head 34. Magnetic line 37 is displaced 180° around the circumference of drum 22 from magnetic line 33 and is shown as a dotted line in FIG- URE 1. The magnetic readout head 34 is designated as the second fixed, or stationary, readout head.

A movable member 40 is rotatably mounted on shaft 20 and is supported by means of a bearing 41. A magnetic readout head 42, having output leads 43 and 44, is connected to the movable member 40 and is positioned adjacent to the surface of drum 22. A magnetic line 45 is recorded on the surface of magnetic drum 22 in a track directly beneath magnetic head 42. Magnetic lines 33 and 45 are substantially colinear in a line parallel to the axis of magnetic drum 22.

A magnetic readout head 46, having output leads 47 and 48, is also connected to movable member 40 and is positioned adjacent to the surface of drum 22. A magnetic line 50 is recorded on the surface of drum 22 in a track directly beneath magnetic readout head 46. Magnetic line 50 is displaced 180° around the circumference of drum 22 from magnetic line 45 and is shown as a dotted line in FIGURE 1. Magnetic lines 50 and 37 are substantially colinear in a line parallel to the axis of drum 22.

STRUCTURE OF FIGURE 2

Figure 2:
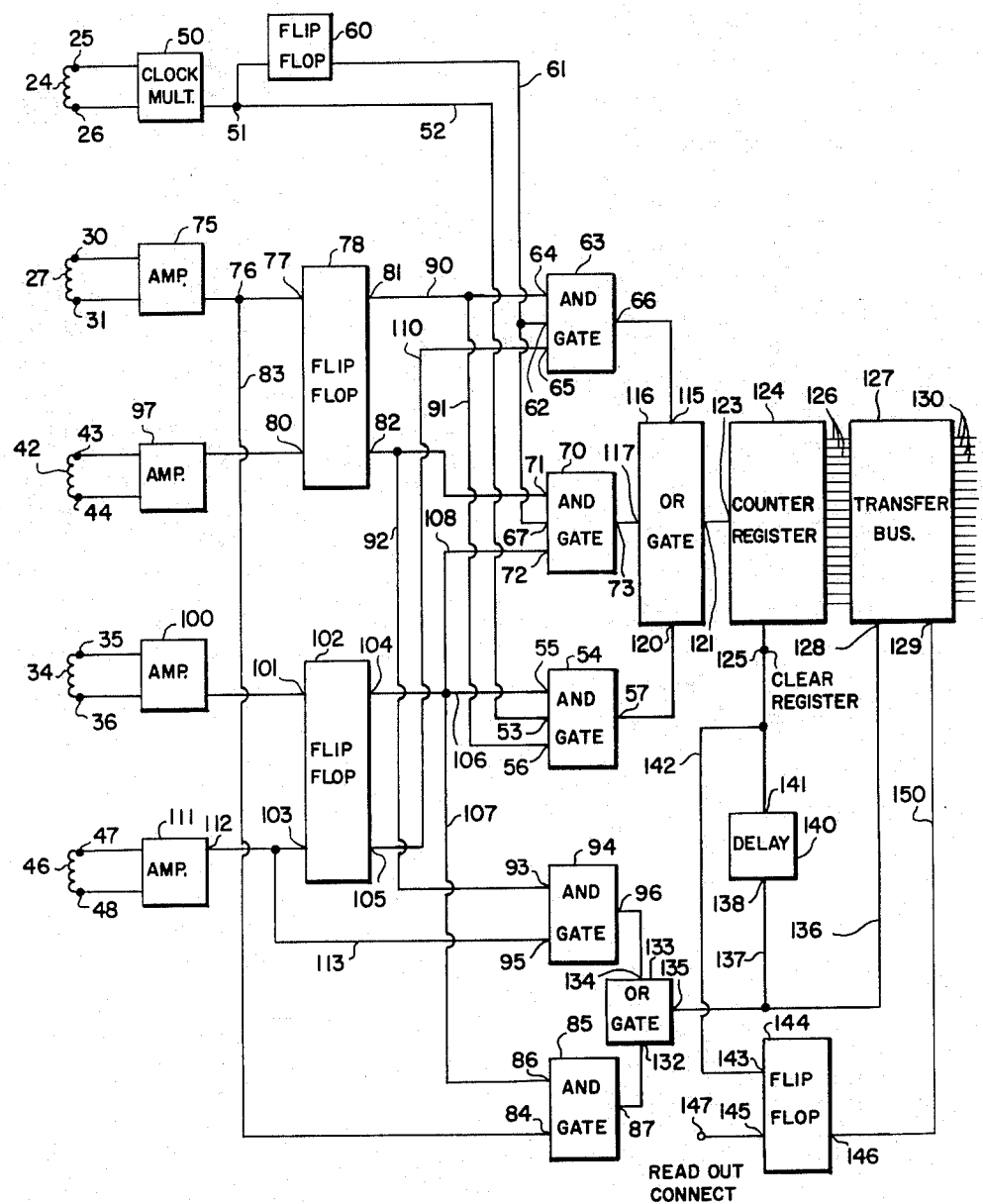
FIGURE 2 is a schematic representation of a logic gate connected to the readout heads of the encoder of FIGURE 1.

Referring to FIGURE 2 there are shown schematically the clock readout head 24, the first fixed readout head 27, the first movable readout head 42, the second fixed readout head 34, and the second movable readout head 46.

Terminals 25 and 26 of the clock readout head are connected to the input of a clock multiplier circuit 50. The output 51 of clock multiplier 50 is connected by means of a conductor 52 to an input 53 of an AND gate 54. AND gate 54 further has an input 55, an input 56, and an output 57. Output 51 of clock multiplier 50 is connected to the input of a flip-flop 60. The output of flip-flop 60 is connected by means of a conductor 61 to an input 62 of an AND gate 63 and to an input 67 of an AND gate 70. AND gate 63 further has an input 64 and an input 65, and an output 66. AND gate 70 further has an input 71, an input 72, and an output 73.

The output leads 30 and 31 of the first fixed readout head 27 are connected to the input of an amplifier 75. The output 76 of amplifier 75 is connected to an input 77 of a flip-flop 78. Flip-flop 78 further has an input 80, an output 81, and an output 82. Output 76 of amplifier 75 is further connected by means of a conductor 83 to an input 84 of an AND gate 85. AND gate 85 further has an input 86 and an output 87.

Output 81 of flip-flop 78 is connected by means of a conductor 90 to the input 64 of AND gate 63, and by means of conductor 90 and a conductor 91 to the input 56 of AND gate 54. Output 82 of flip-flop 78 is connected to the input 71 of AND gate 70, and by means of a conductor 92 to an input 93 of an AND gate 94. AND gate 94 further has an input 95 and an output 96.

Output leads 43 and 44 of the first movable readout head 42 are connected to the input of an amplifier 97 and the output of the amplifier 97 is connected to the input 80 of flip-flop 78.

Output leads 35 and 36 of magnetic readout head 34 are connected to the input of an amplifier 100. The output of amplifier 100 is connected to an input 101 of a flip-flop 102. Flip-flop 102 further has an input 103, an output 104, and an output 105. Output 104 of flip-flop 102 is connected by means of a conductor 106 to the input 55 of AND gate 54. Output 104 of flip-flop 102 is further connected by means of conductor 106 and a conductor 107 to the input 86 of AND gate 85, and by means of conductor 106 and a conductor 108 to the input 72 of AND gate 70. Output 105 of flip-flop 102 is connected by means of a conductor 110 to the input 65 of AND gate 63.

Output leads 47 and 48 of the second movable readout head are connected to the input of an amplifier 111. An output 112 of amplifier 111 is connected to the input 103 of flip-flop 102, and is further connected by means of a conductor 113 to the input 95 of AND gate 94.

Output 66 of AND gate 63 is directly connected to an input 115 of an OR gate 116. OR gate 116 further has an input 117, an input 120, and an output 121.

The output 73 of AND gate 70 is connected directly to the input 117 of OR gate 116. Likewise, the output 57 of AND gate 54 is directly connected to the input 120 of OR gate 116. The output 121 of OR gate 116 is directly connected to an input 123 of a counter register 124. Counter register 124 further has an input 125 and a plurality of outputs indicated as 126. The plurality of outputs 126 of counter register 124 are connected to the input of a transfer bus 127. Transfer bus 127 has a first input 128, a second input 129 and a plurality of outputs indicated as 130.

Output 87 of AND gate 85 is connected to an input 132 of an OR gate 133. OR gate 133 further has an input 134 and an output 135. Output 96 of AND gate 94 is connected directly to the input 134 of OR gate 133. The output 135 of OR gate 133 is connected by means of a conductor 136 to the input 128 of transfer bus 127. Output 135 of OR gate 133 is further connected by means of conductor 136 and a conductor 137 to the input 138 of a delay network 140. Delay network 140 further has an output 141 which is directly connected to the input 125 of counter register 124. Output 141 of delay network 140 is further connected by means of a conductor 142 to an input 143 of a flip-flop 144. Flip-flop 144 further has an input 145 and an output 146. Input 145 of flip-flop 144 is connected to a readout command terminal 147. Output 146 of flip-flop 144 is connected by means of a conductor 150 to the input 129 of transfer bus 127.

OPERATION

Figure 3:
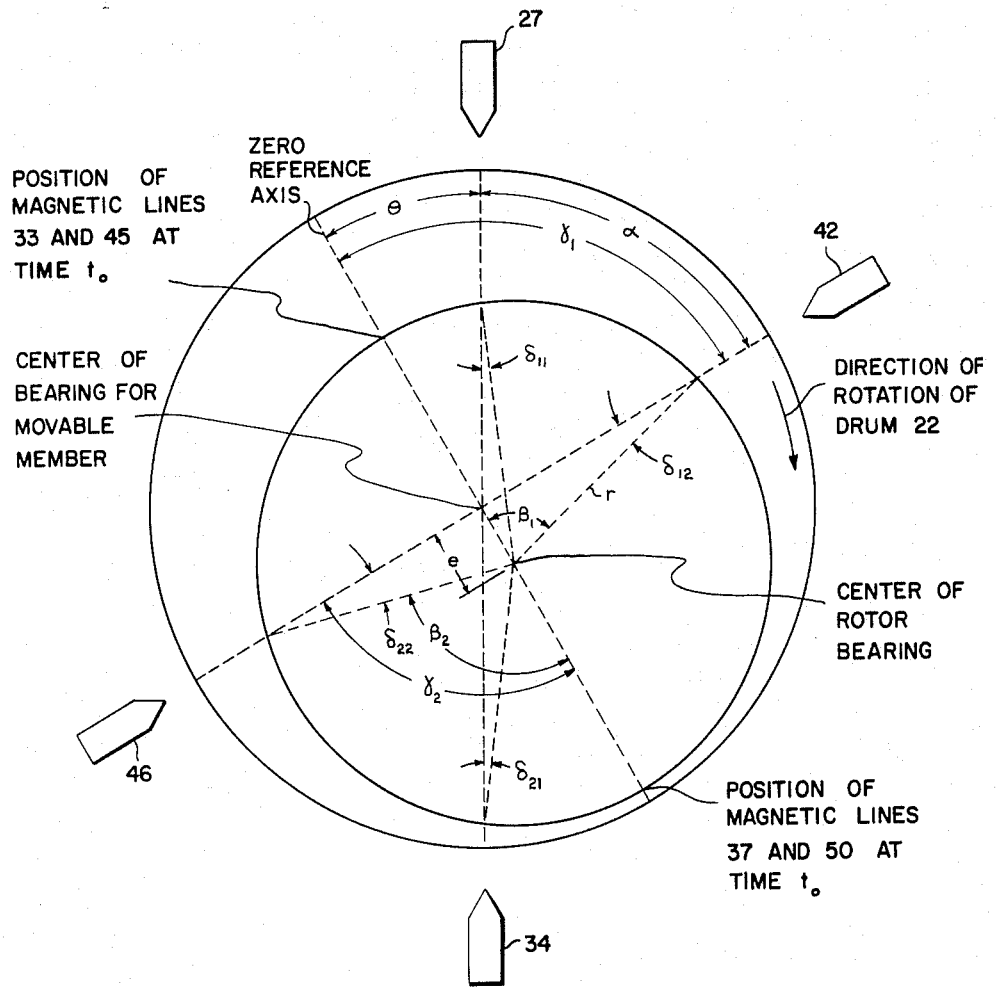
FIGURE 3 is a diagrammatic representation of the error caused by eccentricity between the bearing for the rotor and movable members of FIGURE 1.

FIGURE 3 indicates the degradation of encoder accuracy due to eccentricity between the bearings of the magnetic drum and the movable member. As shown in FIGURE 3, the circular path of movement for the magnetic lines which pulse the stationary and movable pickups will be concentric with the center of rotation of the drum bearing. Displaced an amount, $e$, from the center of rotation of the drum bearing is the center of rotation of the bearing for the movable member which carries the movable pickup. Therefore, the movable pickup will travel in a circular path which is eccentric with respect to the path in which the magnetic line moves.

From FIGURES 3 it can be seen that the angle $\gamma_1$ is equal to $\theta + \alpha$. From the geometry of FIGURE 3, it is evident that the indicated angle $\beta_1$ differs from, and is smaller than, the angle $\gamma_1$ by an amount $\delta_{12}$, and that $\delta_{12} = \gamma_1 - \beta = \theta + \alpha - \beta_1$. It is also evident that $\delta_{12}$ will be zero when $\gamma_1$ equals zero or $\pi$ radians, and that $\delta_{12}$ has its maximum positive value when $\delta_1 = \pi/2$ and its maximum negative value ($\theta_1 > \gamma_1$) when $$\gamma_1 = \frac{3\pi}{2}$$

From FIGURE 3 it can further be seen that $$\frac{e}{\sin \delta_{12}} = \frac{r}{\sin (\pi - \gamma_1)} = \frac{r}{\sin \gamma_1} = \frac{r}{\sin (\theta + \alpha)}$$

and that the $\sin \delta_{12} = e/r \times \sin (\theta + \alpha)$. Since the eccentricity between the two bearings is very small the error $\delta_{12}$ will be small and the sin of $\delta_{12}$ is substantially equal to $\delta_{12}$. Therefore, the error equals $-e/r \sin (\theta + \alpha)$.

The fixed magnetic readout heads 27 and 34 are 180° displaced from each other, as are the movable readout heads 42 and 46. Similarly, the magnetic line associated with readout heads 27 and 42, and the magnetic line associated with readout heads 34 and 46 are 180° displaced from each other. As may be seen in FIGURE 3, the error angle $\delta_{12}$ for the first set of readout heads 27 and 42 will be equal and opposite to the error angle $\delta_{22}$ for the second set of readout heads 34 and 46. That is to say $(\gamma_1 - \beta_1)$ is equal and opposite to $(\gamma_2 - \beta_2)$.

In FIGURE 3, a zero reference axis is taken through the center of the two bearings. Displaced an angle $\theta$ from the reference axis are the two stationary pickups and displaced an additional angle $\alpha$ are the two movable pickups. It is the purpose of the encoder to accurately measure the angle $\alpha$. At the time $t_0$, the lines which will ultimately pulse the stationary and movable pickups are in their respective positions on the reference axis shown in FIGURE 3. At some time, approximately $t_1$ later, the two stationary pickups will be pulsed and at approximately time $t_2$, the two movable pickups will be pulsed. The clock pickup (not shown in FIGURE 3) will be continuously pulsed.

Figure 4:
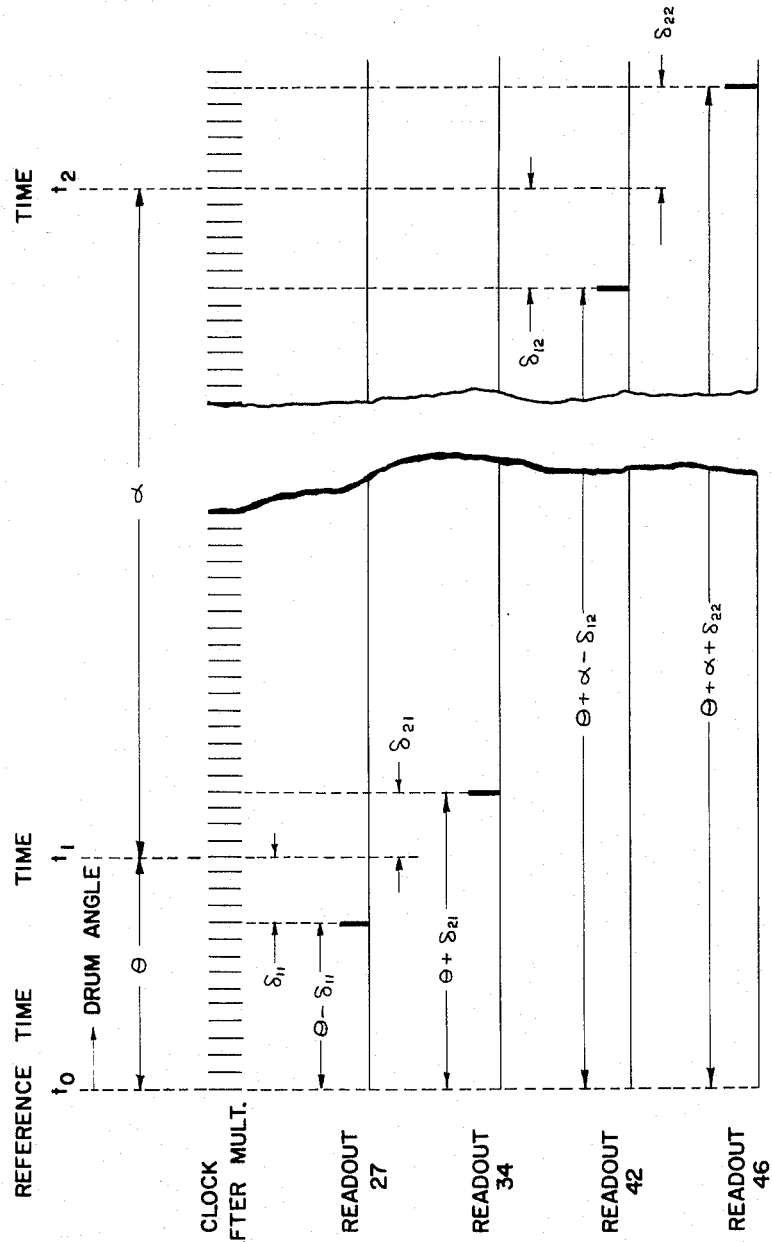
FIGURE 4 shows the timing sequence of pulses induced in the readout heads of the encoder of FIGURE 1.

If, in FIGURES 3 and 4, there were no eccentricity between the bearings, the rotor would have rotated through an angle $\theta$ at exactly time $t_1$, and through an angle $(\theta+\alpha)$ at exactly time $t_2$. Eccentricity, however, will cause the readout head 27 to be pulsed at a rotor angle of $(\theta-\delta_{11})$ and the readout head 34 to be pulsed at a rotor angle of $(\theta+\delta_{21})$. Similarly, the readout head 42 will be pulsed at a rotor angle of $(\theta+\alpha=\delta_{12})$ and the readout head 46 will be pulsed at a rotor angle of $(\theta+\alpha+\delta_{22})$. From the previous discussion it is understood that the magnitudes of $\delta_{11}$ and $\delta_{21}$ are equal and that the magnitude of $\delta_{12}$ and $\delta_{22}$ are equal.

Referring to FIGURE 4 it can be seen that the angle $\alpha$ would be accurately measured if all clock pulses could be counted between the angles $\theta$ and $(\theta+\alpha)$. An accurate measurement of the angle $\alpha$ may also be had by counting one-half the clock pulses between the angle $(\theta-\delta_{11})$ and the angle $(\theta+\delta_{21})$ plus all clock pulses between $\theta+\delta_{21}$ and $\theta+\alpha-\delta_{12}$ plus one-half the clock pulses between $\theta+\alpha-\delta_{12}$ and $\theta+\alpha+\delta_{22}$. In other words, it is necessary to determine the average extent of two quantities, the first quantity being the time between the pulse from readout 27 and the pulse from readout 42, and the second quantity being the time between the pulse from readout 34 and the pulse from readout 46. From FIGURE 4 it can be seen that a portion of each of these two quantities are coextensive, that is, the portion of time between the pulsing of readout head 34 and the pulsing of readout head 42. By measuring the noncoextensive portions of the two quantities at one-half the clock frequency and by measuring the coextensive portion at the full clock frequency, the desired measurement of angle $\alpha$ is obtained. The logic gate circuitry of FIGURE 2 is designed to accomplish this result.

Referring to FIGURE 1, as magnetic drum 22 rotates, magnetic line 33 will pass under readout head 27 and a pulse will appear at the output terminals 30 and 31 of readout head 27. At substantially the same time, except for the eccentricity due to the bearings, magnetic line 37 will pulse readout head 34 and a pulse will appear at output terminals 35 and 36 of readout head 34.

Some time after the pulsing of readout heads 27 and 34, depending upon the angle between movable heads 42 and 46 and stationary heads 27 and 34, magnetic lines 45 and 50 will pulse readout heads 42 and 46, respectively, and output pulses will appear at output terminals 43 and 44 of readout head 42 and output terminals 47 and 48 of readout head 46.

Referring to FIGURE 2 there is shown the clock readout head 24, the first and second stationary readout heads 27 and 34, and the first and second movable readout heads 42 and 46.

The pulses induced in readout head 24 are multiplied in the clock multiplier 50 and the multiple clock output pulses appear at output terminal 51 of clock multiplier 50. The clock pulses at terminal 51 are fed to flip-flop 60 and are divided by two in flip-flop 60 so that one-half the clock repetition frequency appears on conductor 61 while the full clock repetition frequency appears on conductor 52.

The pulse induced in readout head 27 (see FIGURE 2) is coupled through amplifier 75 to the input 77 of flip-flop 78 setting flip-flop 78 so that a signal appears at its output 81 which is coupled through conductor 90 to activate the input 64 of AND gate 63, and is further coupled through conductors 90 and 91 to activate input 56 of AND gate 54.

A pulse induced in readout head 42 is coupled through amplifier 97 to the input 80 of flip-flop 78 thereby setting flip-flop 78 so that a signal appears at output 82 of flip-flip 78 which is coupled to the input 71 of AND gate 70 thereby activating input 71, and is further coupled through conductor 92 to activate input 93 of AND gate 94.

Similarly, the pulse induced in readout head 34 is coupled through amplifier 100 to the input 101 of flip-flop 102 thereby setting flip-flop 102 so that an output signal appears at output 104 which is coupled through conductor 106 to activate input 55 of AND gate 54, through conductors 106 and 107 to activate input 86 of AND gate 85, and through conductors 106 and 108 to activate input 72 of AND gate 70. The pulse induced in readout head 46 is coupled through amplifier 111 to the input 103 of flip-flop 102 thereby setting flip-flop 102 such that a signal appears at output 105 which is coupled through conductor 110 to activate input 65 of AND gate 63.

Initially flip-flops 78 and 102 are set so that an output signal appears at output terminals 82 and 105 respectively, and the counter register 124 is cleared. When a pulse is induced in readout head 27, flip-flop 78 changes state and an output appears at output terminal 81 thereby enabling AND gate 63. When AND gate 63 is enabled the one-half repetition rate clock pulses on conductor 61 are coupled through AND gate 63 and OR gate 116 to the counter register 124. Counting continues at one-half the clock repetition frequency until a pulse is induced in readout head 34. The pulse induced in readout head 34 sets flip-flop 102 so that an output signal appears at output 104 of flip-flop 102 which is coupled to input 55 of AND gate 54 thereby enabling AND gate 54. Since flip-flop 102 has changed states, the signal formerly appearing at output 105 of flip-flop 102 has disappeared and thereby AND gate 63 is inhibited.

When AND gate 54 is enabled the full clock repetition frequency pulses appearing on conductor 52 are coupled through AND gate 54 and OR gate 116 to the input of the counter register 124. Counting now proceeds at the full clock repetition frequency until the pulse is induced in movable readout head 42. The pulse induced in readout head 42 changes the state of flip-flop 78 so that an output signal appears at output terminal 82 of flip-flop 78 which is coupled to input 71 of AND gate 70 thereby enabling AND gate 70. When flip-flop 78 changes state the signal formerly appearing at output 81 disappears and AND gate 54 is inhibited. When AND gate 70 is enabled the one-half repetition frequency clock pulses on conductor 61 are coupled through AND gate 70 and OR gate 116 to the input of counter register 124. Counting is therefore continued at one-half the clock repetition frequency until a pulse is induced in the second movable readout head 46. The pulse induced in readout head 46 sets flip-flop 102 so that an output signal appears at output 105 of flip-flop 102. The gating logic is now in its initial condition so that the counting operation is stopped and the number representing the angle measured is contained in the register.

The output of the counting register 124 is fed to the transfer bus 127 by means of conductors 126. When the pulse is induced in readout head 46 it is coupled through amplifier 111 and conductor 113 to input 95 of AND gate 94. When readout head 46 is pulsed the flip-flop 78 is set so that there is an output appearing at output 82 of flip-flop 78 which is coupled through conductor 92 to enable AND gate 94. Since AND gate 94 is enabled the pulse appearing at input 95 is coupled through AND gate 94, OR gate 133, and conductor 136 to the input 128 of transfer bus 127. If, previous to the pulsing of readout head 46, a readout command signal has been applied to readout command terminal 147, flip-flop 144 will be set so that an output appears at its output terminal 146. This output is coupled through conductor 150 to the input 129 of transfer bus 127 thereby enabling the transfer bus. If the transfer bus is enabled when the pulse appears at its input 128 the information stored in counter register 124 will be transferred to the transfer bus and will appear at output line 130 where it is adapted to be used by any suitable additional circuitry.

The output of OR gate 133 which is fed to input 128 of transfer bus 127 is also coupled through conductor 137 to the input 138 of the delay line 140. After being delayed in delay network 140, the pulse will be fed to the input 125 of counter register 124 thereby returning counter register 124 to zero count. The output of delay network 140 will also be coupled through conductor 142 to the input 143 of flip-flop 144 thereby resetting flip-flop 144.

In FIGURE 4, and in the above discussion, the angle α has been assumed to be of intermediate size so that the readout heads are pulsed in the order 27, 34, 42, and 46. It is possible, however, that the angle could be so small, yet larger than zero, that the order of pulsing the readout heads would be 27, 42, 34 and 46. In this event, counting would begin as before at one-half the clock repetition frequency to AND gate 63 and OR gate 116 when the readout head 27 was pulsed. The counting at one-half the repetition frequency would continue until readout head 42 was pulsed. When readout head 42 was pulsed, flip-flop 78 would be reset so that an output would appear at output terminal 82 of flip-flop 78. When the flip-flop 78 is reset the output at output terminal 81 disappears and AND gate 63 is inhibited thereby stopping the count in the counter register 124.

When readout head 34 is pulsed, flip-flop 102 is set so that an output appears at output terminal 104 of flip-flop 102 which in turn enables AND gate 70. When AND gate 70 is enabled, the one-half repetition frequency clock pulses on conductor 61 are coupled through AND gate 70 and OR gate 116 and are counted in counter register 124. This counting at one-half the clock repetition frequency continues until readout head 46 is pulsed. When readout head 46 is pulsed, flip-flop 102 is reset so that an output appears at output terminal 105 of flip-flop 102. When flip-flop 102 is reset the output at output terminal 104 disappears and AND gate 70 is inhibited thereby stopping the count in counter register 124. It will be noted that the contents of the counter register 124 now contain the sum of the counts as measured independently by the two sets of readout heads. Each of these counts is in error by equal and opposite amounts so that their sum is an accurate measure of the angle α since the counting was done at one-half the repetition rate clock frequency.

There is one other case which can alter the sequence of pulsing of the readout heads. As the angle as shown in FIGURE 4 approaches 360°, the pulse sequence will become 42, 27, 46, and 34. For this sequence of operation, since readout head 34 is the last readout head to be pulsed, flip-flop 102 will be set so that an output signal appears at output terminal 104 of flip-flop 102. The output at output terminal 104 of flip-flop 102 is coupled to conductor 107 thereby enabling input 86 of AND gate 85. When readout head 42 is pulsed flip-flop 78 is set so that an output appears at output terminal 82 of flip-flop 78. When readout 27 is pulsed, flip-flop 78 is reset so that an output appears at terminal 81 of flip-flop 78. A pulse induced in readout head 27 is also coupled from the output 76 of amplifier 75 through conductor 83 to the input 84 of AND gate 85. AND gate 85 is then enabled and an output appears at output terminal 87 of AND gate 85 and is coupled through OR gate 133 and delay network 140 to clear the counter register 124. Flip-flops 78 and 102 are now set so that an output appears at terminals 81 and 104, respectively. These outputs enable AND gate 54 and the full clock repetition rate frequency rate pulses appearing on conductor 52 are coupled through AND gate 54 and OR gate 116 and are counted in counter register 124. This counting at full repetition rate continues until readout head 46 is pulsed. When readout head 46 is pulsed flip-flop 102 is set so that an output appears at its output terminal 105 which is coupled through conductor 110 thereby enabling AND gate 63. When flip-flop 102 changes state, the output at output terminal 104 of flip-flop 102 disappears and AND gate 54 is inhibited.

When AND gate 63 is enabled the one-half repetition rate clock pulses on conductor 61 are coupled through AND gate 63 and OR gate 116 to the counter register 124. Counting is now continued at one-half the repetition rate until readout head 34 is pulsed. When readout head 34 is pulsed flip-flop 102 is set so that an output appears at output terminal 104 of flip-flop 102 thereby enabling AND gate 54. When flip-flop 102 changes state the output terminal 105 disappears and AND gate 63 was inhibited. The output signal at terminal 104 of flip-flop 102 is also coupled to input 86 of AND gate 85 thereby enabling AND gate 85. Counting now continues at the full clock repetition frequency until readout head 42 is pulsed, the pulsing of readout head 42 sets flip-flop 78 so that an output appears at output terminal 82 which enables AND gate 70. When flip-flop 78 changes state the output at output terminal 81 disappeared and AND gate 54 was inhibited. When AND gate 70 is enabled the one-half clock repetition rate signals on conductor 61 are coupled through AND gate 70 and OR gate 116 to the counter register 124. Counting continues at one-half the clock repetition rate until readout head 27 is pulsed. The pulse induced in readout head 27 will be coupled through conductor 83 and AND gate 85, OR gate 133 to the input 128 of transfer bus 127, and will cause the contents of the counter register 124 to be fed to the output line 130 providing that flip-flop 144 has previously been set by a readout command pulse at terminal 147 as hereinbefore described. The output of OR gate 133 will also be delayed in delay network 140 and will clear the counter register 124 and will reset flip-flop 144.

It is to be understood that while I have shown a specific embodiment of my invention that this is for the purpose of illustration only and that my invention is to be limited solely by the scope of the appended claims.

I claim as my invention:
1. Apparatus of the class described comprising:
   a drum rotatable about an axis and having a first, a second, a third, and a fourth signal producing means thereon, the surfaces traced by said first, second, third and fourth signal producing means describing first, second, third and fourth signal tracks respectively when said drum rotates about said axis, said first and second signal producing means being substantially colinear in a line parallel to the axis of the drum and said third and fourth signal producing means being substantially colinear in a line parallel to the axis of said drum, and said third and fourth signal producing means being displaced 180° around the periphery of said drum from said first and second signal producing means;
   a first signal responsive means mounted in a fixed relationship to said first signal track whereby said first signal responsive means delivers a signal when said first signal producing means is in proximity thereto;
   a third signal responsive means mounted in a fixed relationship to said third signal track, and displaced substantially 180° around the periphery of said drum from said first signal responsive means, whereby said third signal responsive means delivers a signal when said third signal producing means is in proximity thereto;
   second and fourth signal responsive means rotatably mounted around said axis in proximity to said second and fourth signal tracks respectively and movable with respect to said first and third signal respon- sive means whereby said second signal responsive means delivers a signal when said second signal producing means is in proximity thereto, and said fourth signal responsive means delivers a signal when said fourth signal producing means is in proximity thereto, said second and fourth signal responsive means being displaced substantially 180° from each other;

pulse generating means for generating pulses at a particular frequency;

pulse counting means; and gating means interconnecting said pulse generating means and said pulse counting means and operable in response to the signals from said first, second, third and fourth signal responsive means to cause said pulse counting means to count one-half the pulses from said pulse generating means during the time between the signals from said first and third signal responsive means, all of the pulses from the pulse generating means between the signals from said third and second signal responsive means and one-half the pulses from said pulse generating means between the signal from said second and fourth signal responsive means.

2. In a digital angle encoder wherein a first fixed condition responsive device and a second bearing supported condition responsive device are utilized to determine an angle between a first member and a second member and wherein the angle determined by said first and second condition responsive devices is in error by an amount delta due to eccentricity of said bearing, the improvement comprising:

a third fixed condition responsive device and a fourth condition responsive device supported by said bearing, said third and fourth condition responsive devices operating to determine the angle between said first member and said second member, said third and fourth condition responsive devices being positioned with respect to said first and second condition responsive devices whereby the angle determined by said third and fourth condition responsive devices is in error by an amount minus delta;

pulse generating means having a first output presenting pulses at a particular frequency and a second output presenting pulses at one-half said particular frequency;

first and second bistable means each having first and second inputs and first and second complement outputs;

means connecting said first and second condition responsive devices to the first and second inputs respectively of said first bistable means;

means connecting said third and fourth condition responsive devices to the first and second inputs respectively of said second bistable means;

first, second, and third AND gates each having first, second and third inputs and an output;

means connecting the first output of said first bistable means to the first inputs of said first and second AND gates;

means connecting the second output of said first bistable means to the first input of said third AND gate;

means connecting the first output of said second bistable means to the second input of said second and third AND gates;

means connecting the second output of said second bistable means to the second input of said first AND gate;

means connecting the first output of said pulse generating means to the third input of said second AND gate;

means connecting the second output of said pulse generating means to the third inputs of said first and third AND gates;

pulse counting means; and means connecting the outputs of said first, second and third AND gates to said pulse counting means.

3. In a digital angle encoder wherein a first fixed condition responsive device and a second bearing supported condition responsive device are utilized to determine an angle between a first member and a second member and wherein the angle determined by said first and second condition responsive devices is in error by an amount delta (due to eccentricity of said bearing), the improvement comprising:

a third fixed condition responsive device and a fourth condition responsive device supported by said bearing, said third and fourth condition responsive devices operating to determine the angle between said first member and said second member, said third and fourth condition responsive devices being positioned with respect to said first and second condition responsive devices whereby the angle determined by said third and fourth condition responsive devices is in error by an amount minus delta;

pulse generating means for generating pulses at a particular frequency;

pulse counting means;

gating means interconnecting said pulse generating means and said pulse counting means; and means connecting said first, second, third and fourth condition responsive devices to said gating means whereby a signal from said first condition responsive device activates said gating means and causes said pulse counting means to count one-half of the pulses from said pulse generating means, a signal from said third condition responsive device activates said gating means and causes said pulse counting means to count all of the pulses from said pulse generating means, a signal from said second condition responsive device activates said gating means and causes said pulse counting means to count one-half of the pulses from said pulse generating means, and a signal from said fourth condition responsive device deactivates said gating means and stops the pulse counting means from counting pulses from said pulse generating means.

4. In a digital angle encoder wherein an angle between a first member and a second member is determined by the activation of a first condition responsive device and a second bearing supported condition responsive device and wherein the angle determined is in error by an amount delta due to eccentricity of said bearing, the improvement comprising:

third and fourth condition responsive devices for determining said angle, said third and fourth condition responsive devices being positioned with respect to said first and second condition responsive devices whereby the angle determined by the activation of said third and fourth condition responsive devices is in error by an amount minus delta;

means for measuring an interval between the activation of said first and third condition responsive devices at a particular rate;

means for measuring an interval between the activation of said third and second condition responsive devices at twice said particular rate; and means for measuring an interval between the activation of said second and fourth condition responsive devices at said particular rate.

5. Apparatus for determining the average extent of two quantities, each of variable extent, when the quantities may be at least partially coextensive comprising:

pulse generating means having a first output of pulses at a particular frequency and a second output of pulses at one-half said particular frequency;

pulse counting means; and gating means interconnecting said pulse generating means and said pulse counting means and operable to cause said pulse counting means to count the pulses at said particular frequency during the coextensive portions of said quantities and to cause said pulse counting means to count the pulses at one-half said particular frequency during the noncoextensive portions of said quantities.

6. Apparatus for determining the average extent of two quantities, each of variable extent, when the quantities may be at least partially coextensive comprising:
  means for measuring the coextensive portions of said quantities at a particular rate;
  means for measuring the noncoextensive portions of said quantities at one-half said particular rate; and
  means for combining the measurements to produce the desired average.

7. In a digital angle encoder wherein a first fixed condition responsive device and a second bearing supported condition responsive device are utilized to determine an angle between a first member and a second member and wherein the angle determined by said first and second condition responsive devices is in error by an amount delta (due to bearing eccentricity), the improvement comprising:
  a third fixed condition responsive device and a fourth condition responsive device supported by said bearing, said third and fourth condition responsive devices operating to determine the angle between said first member and said second member, said third and fourth condition responsive devices being positioned with respect to said first and second condition responsive devices wherein the angle determined by said third and fourth condition responsive devices is in error by an amount minus delta;
  pulse generating means for generating pulses at a particular frequency;
  pulse counting means; and
  gating means having an input adapted to be connected to a pulse generating means and an output adapted to be connected to a pulse counting means, said gating means being connected to said first, second, third and fourth condition responsive devices whereby a signal from said first condition responsive device activates said gating means and causes said pulse counting means to count one-half of the pulses from said pulse generating means, a signal from said third condition responsive device activates said gating means and causes said pulse counting means to count all of the pulses from said pulse generating means, a signal from said second condition responsive device activates said gating means and causes said pulse counting means to count one-half of the pulses from said pulse generating means, and a signal from said fourth condition responsive device deactivates said gating means and stops the pulse counting means from counting pulses from said pulse generating means.

8. Apparatus of the class described comprising:
  a drum rotatable about an axis and having a first, a second, a third, and a fourth signal producing means thereon, the surfaces traced by said first, second, third and fourth signal producing means describing first, second, third and fourth signal tracks respectively when said drum rotates about said axis, said first and second signal producing means being substantially colinear in a line parallel to the axis of the drum and said third and fourth signal producing means being substantially colinear in a line parallel to the axis of said drum, and said third and fourth signal producing means being displaced 180° around the periphery of said drum from said first and second signal producing means;
  a first signal responsive means mounted in a fixed relationship to said first signal track whereby said first signal responsive means delivers a signal when said first signal producing means is in proximity thereto;
  a third signal responsive means mounted in a fixed relationship to said third signal track, and displaced substantially 180° around the periphery of said drum from said first signal responsive means, whereby said third signal responsive means delivers a signal when said third signal producing means is in proximity thereto;
  second and fourth signal responsive means rotatably mounted around said axis in proximity to said second and fourth signal tracks respectively and movable with respect to said first and third signal responsive means whereby said second signal responsive means delivers a signal when said second signal producing means is in proximity thereto, and said fourth signal responsive means delivers a signal when said fourth signal producing means is in proximity thereto, said second and fourth signal responsive means being displaced substantially 180° from each other; and
  gating means having an input adapted to be connected to a pulse generating means for generating pulses at a particular frequency, an output adapted to be connected to a pulse counting means, and operable in response to the signals from said first, second, third and fourth signal responsive means to cause said pulse counting means to count one-half the pulses from said pulse generating means during the time between the signals from said first and third signal responsive means, all of the pulses from the pulse generating means between the signals from said third and second signal responsive means and one-half the pulses from said pulse generating means between the signal from said second and fourth signal responsive means.

No references cited.

MAYNARD R. WILBUR, *Primary Examiner.*